United States Patent
Song et al.

(10) Patent No.: US 12,233,637 B2
(45) Date of Patent: Feb. 25, 2025

(54) GLASS SUBSTRATE MULTILAYER STRUCTURE, A METHOD FOR MANUFACTURING THE SAME, AND A DISPLAY PANEL INCLUDING THE SAME

(71) Applicants: SK Innovation Co., Ltd., Seoul (KR); SK ie technology Co., Ltd., Seoul (KR)

(72) Inventors: Hyun Joo Song, Daejeon (KR); Cheol Min Yun, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 0 days.

(21) Appl. No.: 17/849,826

(22) Filed: Jun. 27, 2022

(65) Prior Publication Data

US 2023/0023962 A1    Jan. 26, 2023

(30) Foreign Application Priority Data

Jun. 28, 2021    (KR) .......................... 10-2021-0083989

(51) Int. Cl.
*B32B 7/12* (2006.01)
*B32B 17/10* (2006.01)
*B32B 27/28* (2006.01)
*B32B 27/38* (2006.01)
*G02B 1/14* (2015.01)

(52) U.S. Cl.
CPC ................. *B32B 7/12* (2013.01); *B32B 17/10* (2013.01); *B32B 27/281* (2013.01); *B32B 27/38* (2013.01); *G02B 1/14* (2015.01); *B32B 2250/02* (2013.01); *B32B 2255/10* (2013.01); *B32B 2255/26* (2013.01); *B32B 2307/3065* (2013.01); *B32B 2307/412* (2013.01); *B32B 2307/536* (2013.01); *B32B 2307/732* (2013.01); *B32B 2457/20* (2013.01); *B32B 2457/202* (2013.01)

(58) Field of Classification Search
CPC ........... B32B 37/12; B32B 7/12; B32B 17/10; B32B 27/34; B32B 2250/02; B32B 2255/10; B32B 2255/26; B32B 2305/72; B32B 2307/3065; B32B 2307/536; B32B 2307/54; B32B 2307/732; B32B 2363/00; B32B 2377/00; B32B 2457/202; B32B 17/00; B32B 27/281; B32B 33/00; B32B 2307/412; B32B 7/022; B32B 7/023; B32B 17/1033; B32B 17/10366; B32B 17/1055; B32B 2255/102; B32B 2379/08; B32B 2457/20; B32B 27/38; C08J 5/18; C08J 7/0427; C08J 2379/08; C08J 2383/06; C08J 7/046; C09D 183/06; C09D 7/63; G02B 1/10; G02B 1/14; G09F 9/30; C08G 73/1042; C08G 77/14; C08K 5/1515

See application file for complete search history.

(56) References Cited

U.S. PATENT DOCUMENTS

| | | | |
|---|---|---|---|
| 6,815,070 | B1 | 11/2004 | Burkle et al. |
| 7,410,686 | B2 | 8/2008 | Osada et al. |
| 10,688,756 | B2 | 6/2020 | Chu et al. |
| 10,964,898 | B2 | 3/2021 | Seki et al. |
| 11,161,323 | B2 | 11/2021 | Choi et al. |
| 2012/0196103 | A1* | 8/2012 | Murashige .......... C03C 17/3405 156/60 |
| 2013/0186548 | A1 | 7/2013 | Takao et al. |
| 2015/0002760 | A1 | 1/2015 | Morimoto et al. |
| 2015/0072125 | A1 | 3/2015 | Murashige et al. |
| 2016/0075110 | A1 | 3/2016 | Kakuta et al. |
| 2018/0034001 | A1 | 2/2018 | Hwang et al. |
| 2020/0133342 | A1 | 4/2020 | Choi et al. |
| 2020/0174161 | A1 | 6/2020 | Ahn et al. |
| 2020/0198302 | A1 | 6/2020 | Murashige et al. |
| 2020/0292731 | A1 | 9/2020 | Park et al. |
| 2020/0342789 | A1 | 10/2020 | Park et al. |
| 2021/0002947 | A1 | 1/2021 | Park et al. |
| 2021/0096280 | A1* | 4/2021 | Kim ....................... B32B 33/00 |
| 2021/0403769 | A1 | 12/2021 | Kiyoto |

FOREIGN PATENT DOCUMENTS

| | | |
|---|---|---|
| JP | 201637048 A | 3/2016 |
| JP | 6350163 B2 | 7/2018 |
| JP | 2019504812 A | 2/2019 |
| JP | 2019119779 A | 7/2019 |
| JP | 202020960 A | 2/2020 |
| KR | 100489727 B1 | 5/2005 |
| KR | 1020050106538 A | 11/2005 |
| KR | 100884917 B1 | 2/2009 |
| KR | 1020120016906 A | 2/2012 |
| KR | 101238214 B1 | 3/2013 |
| KR | 1020130084102 A | 7/2013 |
| KR | 1020130117464 A | 10/2013 |
| KR | 1020150037381 A | 4/2015 |
| KR | 1020160014614 A | 2/2016 |
| KR | 1020160117867 A | 10/2016 |
| KR | 101787941 B1 | 10/2017 |
| KR | 1020170113815 A | 10/2017 |
| KR | 1020180012913 A | 2/2018 |
| KR | 101835933 B1 | 3/2018 |
| KR | 1020180039219 A | 4/2018 |
| KR | 1020190018114 A | 2/2019 |

(Continued)

Primary Examiner — John D Freeman
(74) Attorney, Agent, or Firm — The Webb Law Firm

(57) ABSTRACT

Provided are a glass substrate protective film including an optically transparent adhesive layer; a polyimide-based shatter-proof layer formed on the optically transparent adhesive layer; and a hard coating layer formed on the polyimide-based shatter-proof layer. The hard coating layer and the optically transparent adhesive layer have a thickness of 5 to 20 μm, the polyimide-based shatter-proof layer has a thickness of 20 to 50 μm, the glass substrate protective film has an absolute value of a retardation in a thickness direction ($R_{th}$) of 2000 nm or less, and an adhesive strength when the optically transparent adhesive layer adheres to the glass substrate is 200 gf/in or more. A method for manufacturing the glass substrate laminate and a display panel including the glass substrate laminate are also provided.

13 Claims, No Drawings

(56) References Cited

FOREIGN PATENT DOCUMENTS

| | | |
|---|---|---|
| KR | 1020190059010 A | 5/2019 |
| KR | 101993652 B1 | 9/2019 |
| KR | 102068685 B1 | 1/2020 |
| KR | 102068729 B1 | 1/2020 |
| KR | 1020200005672 A | 1/2020 |
| KR | 1020200016797 A | 2/2020 |
| KR | 102102688 B1 | 4/2020 |
| KR | 1020200040137 A | 4/2020 |
| KR | 1020200049942 A | 5/2020 |
| KR | 102147297 B1 | 8/2020 |
| KR | 1020200098382 A | 8/2020 |

* cited by examiner

GLASS SUBSTRATE MULTILAYER STRUCTURE, A METHOD FOR MANUFACTURING THE SAME, AND A DISPLAY PANEL INCLUDING THE SAME

CROSS-REFERENCE TO RELATED APPLICATION

This application claims priority to Korean Patent Application No. 10-2021-0083989 filed Jun. 28, 2021, the disclosure of which is hereby incorporated by reference in its entirety.

BACKGROUND OF THE INVENTION

Field of the Invention

The following disclosure relates to a glass substrate laminate, a method for manufacturing the same, and a display panel including the same.

Description of Related Art

Recently, thin display devices using a flat panel display device such as a liquid crystal display device or an organic light emitting diode display device are drawing a lot of attention. In particular, these thin display devices are implemented in the form of a touch screen panel to be widely used in LCD and LED display devices and the like mounted on means of transportation such as vehicles, trains, and aircraft.

The touch screen panel-based display devices as such are provided with a window cover for protecting a display on a display panel for protecting the display panel from scratches or external impact, and in most cases, tempered glass for a display is used as a window cover. Tempered glass for a display is thinner than regular glass, but is characterized by being manufactured to be scratch-resistant with high strength.

However, the tempered glass is vulnerable to external impact so that it is difficult to implement unbreakable properties, has low flame retardancy to be vulnerable to fire, and thus, is not suitable as medium and large display materials which are mounted on means of transportation such as vehicles, trains, and aircraft and easily exposed to external impact or fire.

Accordingly, as a new glass substrate laminate to be used in a display panel, the development of a new glass substrate laminate which has improved mechanical properties such as surface hardness, shattering resistance to external impact, and flammability resistance and improved optical properties such as photoisotropy and visibility while having strength or scratch resistance corresponding to existing tempered glass is needed.

SUMMARY OF THE INVENTION

An embodiment of the present invention is directed to providing a glass substrate laminate having excellent mechanical properties and optical properties.

Another embodiment of the present invention is directed to providing a method for manufacturing the glass substrate laminate. Still another embodiment of the present invention is directed to providing a display panel using the glass substrate laminate.

In one general aspect, a glass substrate protective film includes: an optically transparent adhesive layer; a polyimide-based shatter-proof layer formed on the optically transparent adhesive layer; and a hard coating layer formed on the polyimide-based shatter-proof layer, wherein the hard coating layer and the optically transparent adhesive layer have a thickness of 5 to 20 µm, respectively, the polyimide-based shatter-proof layer has a thickness of 20 to 50 µm, the glass substrate protective film has an absolute value of a retardation in a thickness direction ($R_{th}$) of 2000 nm or less, and an adhesive strength when the optically transparent adhesive layer adheres to the glass substrate is 200 gf/in or more.

The polyimide-based shatter-proof layer may include a polyimide polymer including a unit derived from an aromatic diamine, an aromatic dianhydride, and a cycloaliphatic dianhydride.

The hard coating layer may include a unit derived from a condensate of alkoxysilane having an epoxy group.

The condensate of alkoxysilane having an epoxy group may be a silsesquioxane resin having an epoxy group.

The hard coating layer may further include a unit derived from a crosslinking agent having a polyfunctional epoxy group.

In another general aspect, a glass substrate laminate comprising: a glass substrate; and the glass substrate protective film on one surface of the glass substrate. The glass substrate may have a thickness of 100 to 1000 µm.

The glass substrate laminate may have a flame retardant grade of V-0 as evaluated in accordance with a UL-94 VB flame retardant specification.

The glass substrate laminate may have a pencil hardness in accordance with ASTM D3363 of 4H or more.

In another general aspect, a method for manufacturing a glass substrate laminate includes: applying a hard coating layer forming composition on one surface of a polyimide-based shatter-proof layer and curing the composition to form a hard coating layer; attaching an optically transparent adhesive layer to the other surface of the polyimide-based shatter-proof layer; and laminating a glass substrate on the optically transparent adhesive layer, wherein the hard coating layer and the optically transparent adhesive layer have a thickness of 5 to 20 µm, the polyimide-based shatter-proof layer has a thickness of 20 to 50 µm, the glass substrate laminate has an absolute value of a retardation in a thickness direction ($R_{th}$) of 2000 nm or less, and an adhesive strength between the glass substrate and the optically transparent adhesive layer is 200 gf/in or more.

The polyimide-based shatter-proof layer may include a polyimide polymer including a unit derived from an aromatic diamine, an aromatic dianhydride, and a cycloaliphatic dianhydride.

The hard coating layer may include a unit derived from a condensate of alkoxysilane having an epoxy group.

The condensate of alkoxysilane having an epoxy group may be a silsesquioxane resin having an epoxy group.

The hard coating layer forming composition may further include a unit derived from a crosslinking agent having a polyfunctional epoxy group.

The glass substrate laminate may have a flame retardant grade of V-0 as evaluated in accordance with the UL-94 VB flame retardant specification.

The glass substrate laminate may have a pencil hardness in accordance with ASTM D3363 of 4H or more.

In still another general aspect, a display panel includes the glass substrate laminate described above.

Other features and aspects will be apparent from the following detailed description, the drawings, and the claims.

DESCRIPTION OF THE INVENTION

Hereinafter, a glass substrate laminate, a method for manufacturing the same, and a display panel including the same according to the implementation will be described in detail.

Herein, unless otherwise defined, all technical terms and scientific terms have the same meanings as those commonly understood by one of those skilled in the art to which the present invention pertains. The terms used herein are only for effectively describing certain exemplary embodiments, and are not intended to limit the present invention.

Further, unless otherwise stated, the unit of added materials herein may be wt %.

In addition, the singular form used in the specification and claims appended thereto may be intended to also include a plural form, unless otherwise indicated in the context.

Throughout the specification, unless explicitly described to the contrary, "comprising" any constituent elements will be understood to imply further inclusion of other constituent elements rather than the exclusion of any other constituent elements.

Hereinafter, unless otherwise defined in the present specification, it will be understood that when a part such as a layer, a film, a thin film, a region, or a plate is referred to as being "on" or "above" another part, it may include not only the case of being "directly on" the other part but also the case of intervening another part therebetween.

Hereinafter, unless otherwise defined in the present specification, a "combination thereof" refers to a mixture or copolymerization of constituents.

Hereinafter, unless otherwise particularly defined in the present specification, the term "A and/or B" may refer to an embodiment including both A and B or an embodiment selecting one of A and B.

Hereinafter, unless otherwise particularly defined in the present specification, "polymer" may include an oligomer and a polymer, and may include a homopolymer and a copolymer. The oligomer may refer to a case in which the number of repeating units is 2 to 20, and the copolymer may include an alternating polymer, a block copolymer, a random copolymer, a branch copolymer, a crosslinked copolymer, or all of them.

Hereinafter, unless otherwise particularly defined in the present specification, a "polyamic acid" refers to a polymer including a structural unit having an amic acid moiety, and a "polyimide" may refer to a polymer including a structural unit having an imide moiety.

Hereinafter, unless otherwise particularly defined in the present specification, a "shatter-proof layer" may be used in the sense of including a "polyimide-based shatter-proof layer", particularly, specifically, a "fluorine element-containing polyimide-based shatter-proof layer".

Hereinafter, unless otherwise particularly defined in the present specification, a "mura phenomenon" may be interpreted as including all distortion phenomena by light which may be caused at a certain angle. For example, distortion by light, such as a black out phenomenon in which a screen looks black, a hot spot phenomenon, or a rainbow phenomenon having an iridescent stain, in a display device including a polyimide film may be included.

In order to protect a display panel from scratches or external impact, tempered glass which has high strength and is scratch resistant is being used. However, since the tempered glass is easily broken and its flame retardancy is not good, a laminate which has excellent mechanical properties such as shattering resistance and flammability resistance and excellent optical properties such as photoisotropy and visibility while having strength or scratch resistance corresponding to tempered glass is needed.

An implementation provides a glass substrate laminate which has excellent shattering resistance to external impact and flammability resistance, excellent photoisotropy, and no rainbow phenomenon to significantly improve visibility, by laminating a protective film having excellent adhesive strength and a low retardation on a glass substrate.

The protective film may include a polyimide-based shatter-proof layer, a hard coating layer on one surface of the polyimide-based shatter-proof layer, and an optically transparent adhesive layer on the other surface of the polyimide-based shatter-proof layer, and the glass substrate may be in contact with the optically transparent adhesive layer. Accordingly, a laminate including the glass substrate and the protective film may have excellent surface hardness and excellent shattering resistance to external impact, and may have excellent flammability resistance.

The glass substrate protective film according to an embodiment includes:

an optically transparent adhesive layer;
a polyimide-based shatter-proof layer formed on the optically transparent adhesive layer; and
a hard coating layer formed on the polyimide-based shatter-proof layer,
wherein the hard coating layer and the optically transparent adhesive layer have a thickness of 5 to 20 μm, respectively, the polyimide-based shatter-proof layer has a thickness of 20 to 50 μm, the glass substrate protective film has an absolute value of a retardation in a thickness direction ($R_{th}$) of 2000 nm or less, and an adhesive strength when the optically transparent adhesive layer adheres to the glass substrate is 200 gf/in or more.

In another general aspect, a glass substrate laminate comprising: a glass substrate; and the glass substrate protective film on one surface of the glass substrate.

Here, the glass substrate, the optically transparent adhesive layer, the polyimide-based shatter-proof layer, and the hard coating layer may be placed in order. In addition, each layer may be placed directly in contact with each other, and another layer may be placed between each layer.

When the glass substrate laminate has the lamination order described above and the thickness range described above and has the absolute value of the retardation in the thickness direction ($R_{th}$) of 2000 nm or less, and the adhesive strength when the optically transparent adhesive layer adheres to the glass substrate is 200 gf/in or more, excellent surface hardness, shattering resistance to external impact, and flammability resistance may be implemented, and also, photoisotropy is excellent and no rainbow phenomenon occurs to significantly improve visibility.

Specifically, the glass substrate laminate may have the absolute value of the retardation in the thickness direction ($R_{th}$) of 2000 nm or less, specifically 1500 to 2000 nm, and more specifically 1600 to 1900 nm, the absolute value of the retardation in the thickness direction being measured by cutting a film into a certain size, measuring the thickness using Axoscan, measuring a retardation with Axoscan, and performing calibration in a C-plate direction for compensating for the retardation value. Here, the retardation in the thickness direction ($R_{th}$) may be calculated by the following Equation 1:

$$R_{th} = [(n_x + n_y)/2 - n_z] \times d$$

wherein $n_x$ is a highest refractive index in in-plane refractive indexes, $n_y$ is a refractive index perpendicular to $n_x$ in the in-plane refractive indexes, $n_z$ is a vertical refractive index, and d is a value calculated by converting a thickness of a glass substrate laminate to 10 μm.

When the retardation in the thickness direction ($R_{th}$) satisfies the above range, the glass substrate laminate has excellent photoisotropy, a not-easily observed rainbow phenomenon, and significantly improved visibility, so that it may be more appropriately used in a display panel, a device, and the like.

Specifically, as a measure of adhesive strength, for a sample of the glass substrate laminate having a length of 10 cm and a width of 1 inch, the glass substrate and a protective film of the optically transparent adhesive layer, the shatter-proof layer, and the hard coating layer, which is attached to the glass substrate, are pulled using universal testing machine (UTM) equipment (Instron, 3365) under the conditions of a peeling speed of 300 mm/min and a peeling angle of 180° and a force required to completely separate the glass substrate is measured, and as a result, the glass substrate laminate may have a value of 200 gf/in or more, specifically 300 gf/in or more, for example, 200 to 1000 gf/in, and specifically 300 to 1000 gf/in or more.

When the resultant value measured by the above method as the measure of the adhesive strength satisfies the above range, the adhesive strength between the glass substrate and the protective film may be better and more stable and the protective film is not easily peeled off from the glass substrate, and thus, excellent durability may be maintained even during a long-term use and better shattering resistance to external impact may be implemented.

In addition, the glass substrate laminate may have a surface hardness in accordance with ASTM D3363 of 4H or more, specifically 4H to 9H, and more specifically 6H to 9H, but is not necessarily limited thereto. When the surface hardness satisfies the above range, the glass substrate laminate has better strength and may further prevent surface damage by external impact.

In addition, the glass substrate laminate may have a flame retardant grade of V-0, when the glass substrate laminate is burned primarily and secondarily and a burning time and a glowing time are recorded, and evaluation is performed in accordance with the UL-94 VB flame retardant standard, but the present invention is not necessarily limited thereto. The glass substrate laminate satisfying the flame retardant grade has further improved flammability resistance to further improve the problem in which a display panel is broken by external impact and the like to easily cause fire.

Hereinafter, each component of a glass substrate, an optically transparent adhesive layer, a polyimide-based shatter-proof layer, and a hard coating layer included in the glass substrate laminate described above will be described in more detail. However, these are only illustrative and the present invention is not limited to the specific embodiments which are illustratively described.

<Glass Substrate>

First, the glass substrate will be described.

The glass substrate may be formed on one surface of a display panel, and may have transparency, mechanical strength, thermal stability, moisture shielding properties, isotropy, and the like.

The glass substrate is not limited as long as it is a glass substrate generally used in the field, but specifically, it may be tempered glass, and the tempered glass may include Soda-lime silicate gGlass, Borosilicate gGlass, alumino-silicate glass, Phosphate glass, or a combination thereof, and more specifically, may be alumino-silicate glass. For example, the glass substrate may be Corning's Gorilla series glass, specifically, Corning's alumino-silicate-based Gorilla series glass. The glass substrate may not be easily broken by external impact, so that it may be formed on one surface of medium and large display panels which are mounted on vehicles, aircrafts, or the like, and may have a thickness of 100 to 1000 μm, specifically 500 to 1000 μm, but is not necessarily limited thereto.

The glass substrate may further include a chemical reinforcement layer, and the chemical reinforcement layer may be formed by performing a chemical strengthening treatment on any one or more surfaces of both surfaces of the glass substrate, and thus, the strength of the glass substrate may be improved.

As such, there are various methods of forming the chemically strengthened glass substrate, and as an example, an original long glass having a thickness of 100 μm or more may be prepared, processed into a predetermined shape by cutting, chamfering, sintering, and the like, and chemically strengthened, but the present invention is not necessarily limited thereto.

<Optically Transparent Adhesive Layer>

Next, the optically transparent adhesive layer will be described. The optically transparent adhesive layer may be placed on one surface of the glass substrate. The optically transparent adhesive layer is placed between the glass substrate and the polyimide-based shatter-proof layer, thereby significantly improving adhesive strength between the glass substrate and a protective film attached to the glass substrate, so that the bonding is stably performed, the protective film is not easily peeled off from the glass substrate so that excellent durability may be maintained even during a long-term use, and when the protective film is removed, or after reliability is evaluated, defects due to peeling off may be prevented.

The optically transparent adhesive layer is not limited as long as it is adhered to the polyimide-based shatter-proof layer, attached to the glass substrate, and has an adhesive strength with the glass substrate of 200 gf/in or more, specifically 300 gf/in or more, but for example, an optically clear adhesive (OCA) film, an optically clear resin (OCR) film, and the like may be used. Here, the adhesive strength with the glass substrate is not significantly different if the glass substrate is generally used in the field, but specifically, the type of the glass substrate is the same as described above.

When an OCA film is used as the adhesive layer, commercial products such as Nos. 8171, 8172, 8146-1, 8146-2, 8211, 8212, and 8271 available from 3M, 9002D, 1002A, 1003H, and H900 available from LG Chem., CS9862UA and CS9861UAS available from Nitto Denko Corporation may be used, but the present invention is not necessarily limited thereto.

When an OCR film is used as the adhesive layer, commercial products such as SVR7000, SVR1241H, SVR1150, and HSVR330 available from Dexerials Corporation, HRJ-46, HRJ-203, and HRJ-600 available from KYORITSU, InvisiSil OCS200 available from Momentive Inc. may be used, but the present invention is not necessarily limited thereto. The optically transparent adhesive layer may have a thickness of 5 to 20 μm, specifically 5 to 15 μm. The glass substrate laminate includes the optically transparent adhesive layer having the thickness in the range described above, thereby having better adhesive strength between the glass substrate laminate and the protective film, the protective film is not easily peeled off from the glass substrate, thereby further maintaining excellent durability even during a long-term use, and when the protective film is removed or after reliability is evaluated, occurrence of defects due to peeling off may be further reduced. In addition, the surface hardness of the glass substrate laminate is further improved and the flame retardant properties according to the UL-VB specification may be maintained even with slimming and lightweight, and thus, various uses may be secured.

<Polyimide-Based Shatter-Proof Layer>

Next, the polyimide-based shatter-proof layer will be described. The polyimide-based shatter-proof layer may be placed on one surface of the optically transparent adhesive layer. In addition to a basic function of absorbing energy generated upon breakage of the glass substrate to prevent debris shattering, the polyimide-based shatter-proof layer may improve flammability resistance, improve photoisotropy, and further improve optical properties such as visibility and transparency.

The polyimide-based shatter-proof layer may have a thickness of 20 to 50 µm, specifically 20 to 30 µm. The glass substrate laminate includes the polyimide-based shatter-proof layer having the thickness in the range described above, whereby the glass substrate laminate may have better photoisotropy, have excellent visibility so that no rainbow phenomenon is observed, and have better shattering resistance.

The polyimide-based shatter-proof layer may be a shatter-proof layer including a polyimide, in particular, a fluorine element-containing polyimide, and is laminated on the glass substrate with a hard coating layer described later, thereby further improving shattering resistance and flammability resistance to external impact and fire, and also further improving photoisotropy.

The polyimide-based shatter-proof layer may include a unit derived from an aromatic diamine, an aromatic dianhydride, and a cycloaliphatic dianhydride, and specifically, the aromatic diamine may be a fluorine-based aromatic diamine containing a fluorine element, but the present invention is not necessarily limited thereto. In this case, excellent mechanical properties such as surface hardness, shattering resistance, and flammability resistance and excellent optical properties such as photoisotropy and visibility of the laminate may be further improved, and the effect of preventing deformation of the glass substrate may be further enhanced. Here, a composition ratio of the aromatic dianhydride and the cycloaliphatic dianhydride may be 30 to 80 mol % to 70 to 20 mol %, considering the optical properties and the mechanical properties of the glass substrate laminate, but is not necessarily limited thereto.

The fluorine-based aromatic diamine may be any one or a mixture of two or more selected from 1,4-bis(4-amino-2-trifluoromethylphenoxy)benzene (6FAPB), 2,2'-bis(trifluoromethyl)benzidine (TFMB), and 2,2'-bis(trifluoromethyl)-4,4'-diaminodiphenyl ether (6FODA), but is not necessarily limited thereto. In addition, the fluorine-based aromatic diamine may be mixed with other known aromatic diamine components, but the present invention is not necessarily limited thereto. By using the fluorine-based aromatic diamine as such, the mechanical properties and the optical properties of the glass substrate laminate including the polyimide-based shatter-proof layer may be further improved.

The aromatic dianhydride may be any one or a mixture of two or more selected from 4,4'-hexafluoroisopropylidene diphthalic anhydride (6FDA), oxydiphthalic dianhydride (ODPA), sulfonyl diphthalic anhydride (SO2DPA), (isopropylidenediphenoxy) bis(phthalic anhydride) (6HDBA), 4-(2,5-dioxotetrahydrofuran-3-yl)-1,2,3,4-tetrahydronaphthalene-1,2-dicarboxylic dianhydride (TDA), 1,2,4,5-benzene tetracarboxylic dianhydride (PMDA), benzophenone tetracarboxylic dianhydride (BTDA), bis(carboxyphenyl) dimethyl silane dianhydride (SiDA), 9,9-bis(3,4-dicarboxyphenyl)fluorene dianhydride (BPAF), ethylene glycol bis (anhydrotrimellitate) (TMEG100), and the like, but is not necessarily limited thereto.

The cycloaliphatic dianhydride may be any one or a mixture of two or more selected from pyromellitic dianhydride (PMDA-H), 5-(2,5-dioxotetrahydrofuryl)-3-methylcyclohexene-1,2-dicarboxylic dianhydride (DOCDA), bicyclooxtene-2,3,5,6-tetracarboxylic dianhydride (BODA), 1,2,4-tricarboxy-3-methylcarboxycyclopentane dianhydride (TMDA), 1,2,3,4-tetracarboxycyclopentane dianhydride (TCDA), and the like, but is not necessarily limited thereto.

<Hard Coating Layer>

Next, the hard coating layer will be described.

The hard coating layer may be placed on one surface of the polyimide-based shatter-proof layer. The hard layer may protect the polyimide-based shatter-proof layer having excellent optical and mechanical properties from external physical and chemical damage.

The hard coating layer may be formed by curing a hard coating layer forming composition, and also, may be a composite hard coating layer obtained by photocuring and then thermally curing the hard coating layer forming composition, but is not necessarily limited thereto.

The hard coating layer may have a thickness of 5 to 20 µm, specifically 5 to 15 µm. The glass substrate laminate includes the hard coating layer having the thickness in the range described above, thereby having better surface hardness and shattering resistance.

The hard coating layer is not particularly limited as long as it is formed on the polyimide-based shatter-proof layer and may protect the polyimide-based shatter-proof layer from the outside. Specifically, the hard coating layer may include any one or more polymers selected from an acrylic polymer, a silicon-based polymer, an epoxy-based polymer, a urethane-based polymer, and the like.

The hard coating layer may include a unit derived from a condensate of alkoxysilane having an acryl or epoxy group, and for example, the condensate of alkoxysilane having an epoxy group may be a siloxane-based resin including an epoxy group, but the present invention is not necessarily limited thereto. The hard coating layer includes the unit derived from a condensate of alkoxysilane having an epoxy group, whereby the glass substrate laminate including the hard coating layer may show better hardness after curing and have excellent flame retardant properties.

The epoxy group may be any one or more selected from a cyclic epoxy group, an aliphatic epoxy group, and an aromatic epoxy group, and the siloxane-based resin may refer to a polymer compound including a moiety in which a silicon atom and an oxygen atom form a covalent bond, and for example, may refer to a polymer compound including a moiety in which a silicon atom and an oxygen atom form a covalent bond in a main chain or a backbone.

The condensate of alkoxysilane having an epoxy group may be a silsesquioxane resin having an epoxy group, specifically, a silsesquioxane resin in which a silicon atom is directly substituted with an epoxy group or a substituent of the silicon atom is substituted with an epoxy group, and more specifically, the epoxy siloxane resin may be a silsesquioxane resin substituted with 2-(3,4-epoxycyclohexyl) ethyl group, but the present invention is not necessarily limited thereto.

The condensate of alkoxysilane having an epoxy group may have a weight average molecular weight of 1,000 to 20,000 g/mol, specifically 1,000 to 18,000 g/mol, and more specifically 2,000 to 15,000 g/mol. When the weight average molecular weight is in the range described above, the flowability, coatability, curing reactivity, and the like of the hard coating layer forming composition may be further improved.

The condensate of alkoxysilane having an epoxy group may include a repeating unit derived from an alkoxysilane compound represented by the following Chemical Formula 1:

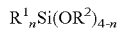  [Chemical Formula 1]

$R^1{}_n Si(OR^2)_{4-n}$ wherein $R^1$ is a linear or branched alkyl group having 1 to 6 carbon atoms substituted with an epoxycycloalkyl group having 3 to 6 carbon atoms or an oxiranyl group, in which the alkyl group may include an ether group, $R^2$ is a linear or branched alkyl group having 1 to 7 carbon atoms, and n is an integer of 1 to 3.

The alkoxysilane compound represented by Chemical Formula 1 may be, for example, 2-(3,4-epoxycyclohexyl)ethyltrimethoxysilane, 2-(3,4-epoxycyclohexyl)ethyltriethoxysilane, 3-glycidoxypropyltrimethoxysilane, and the like and may be used alone or in combination of two or more, but is not necessarily limited thereto.

The condensate of alkoxysilane having an epoxy group may be included at 20 to 70 parts by weight, specifically 20 to 50 parts by weight with respect to 100 parts by weight of the hard coating layer forming composition described later, but is not necessarily limited thereto. When the above range is satisfied, the composition for forming a hard coating layer may secure better flowability and coating property. In addition, the hard coating layer forming composition may be uniformly cured at the time of curing, so that physical defects such as cracks due to overcuring may be more effectively prevented, and a hard coating layer manufactured therefrom may show better hardness.

The hard coating layer may further include a unit derived from a crosslinking agent having a polyfunctional epoxy group. The crosslinking agent may form crosslinks with the condensate of alkoxysilane having an epoxy group to solidify the hard coating layer forming composition and further improve the hardness of the hard coating layer.

The crosslinking agent may include a compound having an alicyclic epoxy group. For example, the crosslinking agent may include a compound in which two 3,4-epoxycyclohexyl groups are connected to each other, but is not necessarily limited thereto. The crosslinking agent may have similar structure and nature to the condensate of alkoxysilane having an epoxy group, and in this case, the crosslinking agent may further promote the crosslink of the condensate of alkoxysilane having an epoxy group and maintain the composition at a more appropriate viscosity.

The content of the crosslinking agent is not particularly limited, and for example, may be 5 to 150 parts by weight with respect to 100 parts by weight of the condensate of alkoxysilane having an epoxy group, but is not necessarily limited thereto. When the content of the crosslinking agent is within the above range, the viscosity of the composition may be maintained in an appropriate range, and coatability and curing reactivity may be more improved.

In addition, the hard coating layer may further include an inorganic filler. An example of the inorganic filler may include metal oxides such as silica, alumina, and titanium oxide; hydroxides such as aluminum hydroxide, magnesium hydroxide, and potassium hydroxide; metal particles such as gold, silver, bronze, nickel, and alloys thereof; conductive particles such as carbon, carbon nanotubes, and fullerene; glass; ceramic; and the like, alone or in combination of two or more, but is not necessarily limited thereto. A hard coating layer further including the inorganic filler may have further improved flame retardant properties.

In addition, the hard coating layer may further include a lubricant. The lubricant may improve winding efficiency, blocking resistance, wear resistance, scratch resistance, and the like. An example of the lubricant may include waxes such as polyethylene wax, paraffin wax, synthetic wax, or Montan wax; synthetic resins such as a silicone-based resin or a fluorine-based resin; and the like, alone or in combination of two or more, but is not necessarily limited thereto.

<Display Panel>

Another implementation may provide a display panel or a display device including the glass substrate laminate described above. Here, the glass substrate laminate may be used as an outermost surface window cover of the display device. The display device may be various image display devices such as a common liquid crystal display device, an electroluminescent display device, a plasma display device, and a field emission display device. Since the protective film is not easily peeled off from the glass substrate with excellent adhesive strength, the glass substrate laminate may maintain excellent durability even during a long-term use, and may prevent a shattering phenomenon by external impact or an outbreak of fire by excellent shattering resistance and flammability resistance, and also, excellent photoisotropy, visibility, transparency, and the like at a level which is very suitable for use in a display device may be implemented.

Therefore, the glass substrate laminate may be very suitable for being mounted on means of transportation such as vehicles, trains, and aircraft vulnerable to external impact or fire, and use as an outermost surface window cover for protecting medium and large display devices used in an enclosed space.

<Method for Manufacturing Glass Substrate Laminate>

Another implementation provides a method for manufacturing the glass substrate laminate described above.

The method for manufacturing a glass substrate laminate includes: applying a hard coating layer forming composition on one surface of a polyimide-based shatter-proof layer and curing the composition to form a hard coating layer;
attaching an optically transparent adhesive layer to the other surface of the polyimide-based shatter-proof layer; and
laminating a glass substrate on the optically transparent adhesive layer,
wherein the hard coating layer and the optically transparent adhesive layer have a thickness of 5 to 20 μm, the polyimide-based shatter-proof layer has a thickness of 20 to 50 μm, the glass substrate laminate has an absolute value of a retardation in a thickness direction ($R_{th}$) of 2000 nm or less, and an adhesive strength between the glass substrate and the optically transparent adhesive layer is 200 gf/in or more.

Since the thickness of each layer and the physical properties of the glass substrate laminate are as described above for the glass substrate laminate, the detailed description thereof will be omitted.

First, a shatter-proof layer forming composition which forms the polyimide-based shatter-proof layer will be described.

The shatter-proof layer forming composition may include a unit derived from an aromatic diamine, an aromatic dianhydride, and a cycloaliphatic dianhydride, and specifically, the aromatic diamine may be a fluorine-based aromatic diamine, but the present invention is not necessarily limited thereto.

The fluorine-based aromatic diamine, the aromatic dianhydride, and the cycloaliphatic dianhydride may be as described above for the polyimide-based shatter-proof layer.

As a more specific embodiment, the shatter-proof layer forming composition may be a polyimide precursor prepared by adding an aromatic dianhydride to a mixed solution in which a fluorine-based aromatic diamine is dissolved in an organic solvent and performing a polymerization reaction. Here, the polymerization reaction may be carried out under an inert gas or a nitrogen stream, or may be performed in anhydrous conditions. In addition, a temperature in the polymerization reaction may be −20 to 200° C., specifically 0 to 180° C., but is not necessarily limited thereto.

In addition, the organic solvent used in the polymerization reaction may be any one or a mixture of two or more selected from dimethylacetamide (DMAc), N-methyl-2-pyrrolidone (NMP), dimethylformamide (DMF), dimethylform sulfoxide (DMSO), ethyl cellosolve, methyl cellosolve, acetone, diethyl acetate, m-cresol, and the like, but is not necessarily limited thereto.

Here, the polyimide precursor may be in the form of a polyimide precursor solution which is any one selected from a solution form dissolved in an organic solvent, a diluted form of the solution with another solvent, a solution form obtained by dissolving a polyimide precursor in an organic solvent, in the case of obtaining the polyimide precursor as solid powder, or the like, but is not necessarily limited thereto.

Thereafter, the polyimide precursor may be imidized, thereby preparing the shatter-proof layer forming composition. The imidization process may use a known imidization method without limitation, but as a specific example, a chemical imidization method, a thermal imidization method, and the like may be used, and specifically, an azeotropic thermal imidization method or a chemical imidization method may be used, but the present invention is not necessarily limited thereto.

The azeotropic thermal imidization method may be, as an example, adding toluene or xylene to a solution including the polyimide precursor and performing stirring to carry out an imidization reaction at 160 to 200° C. for 6 to 24 hours, and water released by production of an imide ring may be separated as an azeotropic mixture of toluene or xylene, but the present invention is not necessarily limited thereto.

Hereinafter, a film forming method of a polyimide-based shatter-proof layer will be described.

A film forming step of the polyimide-based shatter-proof layer may be performed by applying the shatter-proof layer forming composition on a support and then curing the composition. Here, the application method may be any one selected from bar coating, dip coating, die coating, gravure coating, comma coating, and slit coating, or a combination thereof, but is not necessarily limited thereto.

The curing may be a heat treatment at a temperature of 50 to 250° C., the number of heat treatments may be one or more, and the heat treatment may be performed once or more at the same temperature or in different temperature ranges, but is only a non-limiting example, and the present invention is not necessarily limited thereto. In addition, the heat treatment time may be 1 minute to 60 minutes, but is not necessarily limited thereto.

Hereinafter, a hard coating layer forming composition for forming the hard coating layer will be described.

The hard coating layer forming composition may include a condensate of alkoxysilane having an epoxy group, and the condensate of alkoxysilane having an epoxy group may be as described above for the hard coating layer.

The hard coating layer forming composition may further include a thermal initiator including a compound represented by the following Chemical Formula 2 and a photoinitiator:

[Chemical Formula 2]

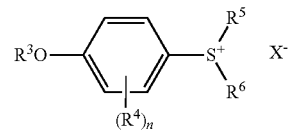

wherein $R^3$ is hydrogen, an alkoxycarbonyl group having 1 to 4 carbon atoms, an alkylcarbonyl group having 1 to 4 carbon atoms, or an arylcarbonyl group having 6 to 14 carbon atoms, $R^4$ is independently of each other hydrogen, halogen, or an alkyl group having 1 to 4 carbon atoms, n is 1 to 4, $R^5$ is an alkyl group having 1 to 4 carbon atoms or an aralkyl group having 7 to 15 carbon atoms which may be substituted by an alkyl group having 1 to 4 carbon atoms, $R^6$ is an alkyl group having 1 to 4 carbon atoms, and X is $SbF_6$, $PF_6$, $AsF_6$, $BF_4$, $CF_3SO_3$, $N(CF_3SO_2)_2$, or $N(C_6F_5)_4$.

The alkoxy portion of the alkoxycarbonyl group has 1 to 4 carbon atoms, and an example of the alkoxycarbonyl group may include a methoxycarbonyl group, an ethoxycarbonyl group, a propoxycarbonyl group, and the like.

The alkyl portion of the alkylcarbonyl group has 1 to 4 carbon atoms, and an example of the alkylcarbonyl group may include an acetyl group, a propionyl group, and the like.

The aryl portion of the arylcarbonyl group has 6 to 14 carbon atoms, and an example of the arylcarbonyl group may include a benzoyl group, a 1-naphthylcarbonyl group, a 2-naphthylcarbonyl group, and the like.

An example of the aralkyl group may include a benzyl group, a 2-phenylethyl group, a 1-naphthylmethyl group, a 2-naphthylmethyl group, and the like.

By using the compound of Chemical Formula 2 as a thermal initiator, a cure half-life may be further shortened and thermal curing may be more rapidly performed even in low-temperature conditions, and thus, damage and deformation occurring when a long-term heat treatment is performed under high-temperature conditions may be further prevented.

The thermal initiator may promote the crosslinking reaction of the condensate of alkoxysilane having an epoxy group or the crosslinking agent later when heat is applied to the hard coating layer forming composition. As the thermal initiator, a cationic thermal initiator may be used, but the present invention is not necessarily limited thereto.

In addition, photocuring using the photoinitiator is used in combination with the thermal curing using the thermal initiator, thereby further improving the curing degree, the hardness, and the like of the hard coating layer. For example, the hard coating layer forming composition is applied to the polyimide-based shatter-proof layer and irradiated with ultraviolet rays (photocuring) to at least partially cure the composition, and then heat is further applied (thermal curing) to substantially completely cure the composition.

The hard coating layer forming composition may be semi-cured or partially cured by the photocuring, and the semi-cured or partially cured hard coating layer forming composition may be substantially completely cured by the thermal curing.

For example, when the hard coating layer forming composition is cured only by photocuring, a curing time is excessively extended, or in part, curing may not be completely performed. However, when the photocuring is followed by the thermal curing, the portion which is not cured by the photocuring may be substantially completely cured by the thermal curing, and the curing time may be also further reduced.

Though the method for first photocuring the hard coating layer forming composition and performing further thermal curing has been described above, the sequence of the photocuring and the thermal curing is not particularly limited thereto. That is, in some exemplary embodiments, the thermal curing may be first performed and then the photocuring may be performed, of course.

In some exemplary embodiments, the thermal initiator may be included at 0.1 to 20 parts by weight, and more specifically 1 to 20 parts by weight with respect to 100 parts by weight of the condensate of alkoxysilane having an epoxy group, but is not necessarily limited thereto. When the content of the thermal initiator is within the range, the thermal curing reaction may proceed at a more effective rate, and deterioration of the mechanical properties of the hard coating layer may be further prevented.

In addition, for example, the thermal initiator may be included at 0.01 to 15 parts by weight, specifically 0.1 to 15 parts by weight, and more specifically 0.3 to 10 parts by weight with respect to a total of 100 parts by weight of the hard coating layer forming composition, but is not necessarily limited thereto.

The photoinitiator may include a photo-cationic initiator. The photo-cationic initiator may initiate polymerization of the condensate of alkoxysilane having an acryl group or an epoxy group and an acrylic or epoxy-based monomer.

As the photo-cationic initiator, an onium salt and/or an organic metal salt, and the like may be used, and for example, a diaryliodonium salt, triarylsulfonium salt, an aryldiazonium salt, an iron-arene composite, and the like may be used alone or in combination of two or more, but the present invention is not necessarily limited thereto.

The content of the photoinitiator is not particularly limited, but for example, the photoinitiator may be included at 0.1 to 15 parts by weight, specifically 1 to 15 parts by weight with respect to 100 parts by weight of the condensate of alkoxysilane having an epoxy group, but is not necessarily limited thereto. When the content of the photoinitiator is within the above range, better curing efficiency of the hard coating layer forming composition may be maintained, and deterioration of the physical properties due to residual components after curing may be prevented. In addition, for example, the photoinitiator may be included at 0.01 to 10 parts by weight, specifically 0.1 to 10 parts by weight, and more specifically 0.3 to 5 parts by weight with respect to a total of 100 parts by weight of the hard coating layer forming composition, but is not necessarily limited thereto.

The hard coating layer forming composition may further include a crosslinking agent. The crosslinking agent may form crosslinks with the condensate of alkoxysilane having an acryl group or an epoxy group to solidify the hard coating layer forming composition and further improve the hardness of the hard coating layer.

The crosslinking agent may include a compound having an alicyclic epoxy group. For example, the crosslinking agent may include a compound in which two 3,4-epoxycyclohexyl groups are connected to each other, but is not necessarily limited thereto. The crosslinking agent may have similar structure and nature to the condensate of alkoxysilane having an epoxy group, and in this case, the crosslinking agent may promote the crosslink of the condensate of alkoxysilane having an epoxy group and maintain the composition at an appropriate viscosity.

The content of the crosslinking agent is not particularly limited, and for example, may be 5 to 150 parts by weight with respect to 100 parts by weight of the condensate of alkoxysilane having an acryl group or epoxy group, but is not necessarily limited thereto. When the content of the crosslinking agent is within the above range, the viscosity of the composition may be maintained in an appropriate range, and coatability and curing reactivity may be more improved.

In addition, for example, the crosslinking agent may be included at 1 to 30 parts by weight, specifically 5 to 20 parts by weight with respect to a total of 100 parts by weight of the hard coating layer forming composition, but is not necessarily limited thereto. The hard coating layer forming composition may further include a thermal curing agent.

The thermal curing agent may include amine-based, imidazole-based, acid anhydride-based, amide-based thermal curing agents, and the like, and more specifically, an acid anhydride-based thermal curing agent may be further used in terms of discoloration prevention and high hardness implementation, and these may be used alone or in combination of two or more, but the present invention is not necessarily limited thereto.

The content of the thermal curing agent is not particularly limited, and for example, may be included at 5 to 30 parts by weight with respect to 100 parts by weight of the condensate of alkoxysilane having an epoxy group, but is not necessarily limited thereto. When the content of the thermal curing agent is within the above range, the hardness efficiency of the hard coating layer forming composition may be further improved to form a hard coating layer having better hardness.

The hard coating layer forming composition may further include a solvent. The solvent is not particularly limited and a solvent known in the art may be used.

A non-limiting example of the solvent may include alcohol-based solvents (such as methanol, ethanol, isopropanol, butanol, methyl cellosolve, and ethyl cellosolve), ketone-based solvents (such as methyl ethyl ketone, methyl butyl ketone, methyl isobutyl ketone, diethyl ketone, dipropyl ketone, and cyclohexanone), hexane-based solvents (such as hexane, heptane, and octane), benzene-based solvents (such as benzene, toluene, and xylene), and the like. These may be used alone or in combination of two or more.

The content of the solvent is not particularly limited, and for example, may be 10 to 200 parts by weight, based on 100 parts by weight of the condensate of alkoxysilane having an epoxy group. When the above range is satisfied, the hard coating layer forming composition may secure an appropriate level of viscosity, and workability at the time of forming the hard coating layer may be better. In addition, it is easy to adjust the thickness of the hard coating layer, and the solvent drying time is reduced, whereby a more rapid process speed may be secured.

The solvent may be included at a residual amount excluding the amounts of other components in the total weight of the predetermined entire hard coating layer forming composition. For example, when the total weight of the predetermined entire composition is 100 g and the sum of the weights of the components other than the solvent is 70 g, 30 g of the solvent will be included, but the present invention is not necessarily limited thereto.

The hard coating layer forming composition may further include an inorganic filler. The inorganic filler may further improve the hardness of the hard coating layer, and may further improve flame retardancy.

The inorganic filler is not particularly limited, and an example thereof may include metal oxides such as silica, alumina, and titanium oxide; hydroxides such as aluminum hydroxide, magnesium hydroxide, and potassium hydroxide; metal particles such as gold, silver, bronze, nickel, and alloys thereof; conductive particles such as carbon, carbon nanotubes, and fullerene; glass; ceramic; and the like, and, specifically, in terms of commerciality with other components of the hard coating layer forming composition, silica may be used, and these may be used alone or in combination of two or more, but the present invention is not necessarily limited thereto.

The hard coating layer forming composition may further include a lubricant. The lubricant may further improve winding efficiency, blocking resistance, wear resistance, scratch resistance, and the like.

The kind of lubricant is not particularly limited, and for example, waxes such as polyethylene wax, paraffin wax, synthetic wax, or Montan wax; synthetic resins such as silicon-based resin and fluorine-based resin; and the like may be used, and these may be used alone or in combination of two or more, but the present invention is not necessarily limited thereto.

Besides, the hard coating layer forming composition may further include additives such as, for example, an antioxidant, a UV absorber, a photostabilizer, a thermal polymerization inhibitor, a leveling agent, a surfactant, a lubricant, and an antifouling agent.

Hereinafter, a method for forming the hard coating layer will be described.

The hard coating layer may be formed by applying the hard coating layer forming composition on the polyimide-based shatter-proof layer and curing the composition. Here, the application method may be any one selected from bar coating, dip coating, die coating, gravure coating, comma coating, and slit coating, or a combination thereof, but is not necessarily limited thereto.

Curing in the hard coating layer formation may be performed by photocuring or thermal curing alone, photocuring followed by thermal curing, thermal curing followed by photocuring, or the like, but is not necessarily limited thereto.

As a non-limiting example, a step of pretreatment by heating the hard coating layer forming composition before the photocuring may be further included, and the pretreatment may be performed at a lower temperature than the thermal curing, but is not necessarily limited thereto.

Hereinafter, the implementation will be described in more detail with reference to the examples and the comparative examples. However, the following examples and comparative examples are only one example for describing the implementation in more detail, and do not limit the present invention in any way.

[Method for Measuring Physical Properties]

(1) Surface Hardness

A pencil hardness on a surface of the glass substrate laminates manufactured in the examples and the comparative examples was measured using pencils by hardness (Mitsubishi Pencil Co., Ltd.) under a load of 750 gf using a pencil hardness tester (Kipae E&T Co. Ltd.), in accordance with ASTM D3363. At this time, the surface of the glass substrate laminate on which the measurement was performed was the surface on which a hard coating layer was formed.

(2) Retardation ($R_{th}$)

The retardation was measured using Axoscan. The glass substrate laminate was cut into a certain size, the thickness thereof was measured, the retardation was measured with Axoscan, and the measured thickness (nm) was input while performing calibration in a C-plate direction for compensating for the retardation value.

$$R_{th}=[(n_x+n_y)/2-n_z]\times d \qquad \text{[Equation 1]}$$

wherein $n_x$ is a highest refractive index in in-plane refractive indexes, $n_y$ is a refractive index perpendicular to $n_x$ in the in-plane refractive indexes, $n_x$ is a vertical refractive index, and d is a value calculated by converting a thickness of a glass substrate laminate to 10 μm.

(3) Rainbow Phenomenon

A polarizing film (Nitto Denko Corporation) was attached to one surface of the glass substrate laminates manufactured in the following examples and the comparative examples, and evaluation was performed by the following criteria, depending on whether a rainbow was seen, when the plate was visually observed at a viewing angle of 60°.

<Evaluation Criteria>

OK: no rainbow and uniform color shown

NG: strong rainbow and strong color shown (4) Flame Retardant Grade

The glass substrate laminates manufactured in the following examples and the comparative examples were burned primarily and secondarily, the burning time and the glowing time were recorded, and evaluation was performed by a flame retardant grade in accordance with the UL-94 VB flame retardant specification.

(5) Shattering Resistance

After a steel ball (weight: 500 g) was dropped on the glass substrate laminates manufactured in the following examples and the comparative examples from a height of 3 m, the substrate state was evaluated by the following criteria. At this time, the steel ball was dropped on a surface having a hard coating layer formed thereon.

<Evaluation Criteria>

OK: a weight difference of the laminate before and after dropping the steel ball was less than 0.01 g (not scattering).

NG: a weight difference of the laminate before and after dropping the steel ball was 0.01 g or more.

(6) Adhesive Strength

The glass substrate laminates manufactured in the following examples and the comparative examples were prepared into a sample form having a length of 10 cm and a width of 1 inch. Thereafter, the protective film of the optically transparent adhesive layer, the shatter-proof layer, and the hard coating layer, which was attached to the glass substrate, was pulled under the conditions of a peeling speed of 300 mm/min and a peeling angle of 180° using universal testing machine (UTM) equipment (Instron, 3365) to measure a force required to completely separate the glass substrate.

[Preparation of Composition for Forming Hard Coating Layer]

Preparation Example 1

2-(3,4-epoxycyclohexyl)ethyltrimethoxysilane (ECTMS, TCI) and water were mixed at a ratio of 24.64 g:2.70 g (0.1 mol:0.15 mol) to prepare a reaction solution and the reaction solution was added to a 250 mL 2-neck flask. 0.1 mL of a tetramethylammonium hydroxide catalyst (Aldrich) and 100 mL of tetrahydrofuran (Aldrich) were added to the mixture and stirring was performed at 25° C. for 36 hours.

Thereafter, layer separation was performed and a product layer was extracted with methylene chloride (Aldrich), moisture was removed from the extract with magnesium sulfate (Aldrich), and the solvent was dried under vacuum to obtain an epoxy siloxane-based resin. 30 g of the epoxy siloxane-based resin as prepared above, 10 g of (3',4'-epoxycyclohexyl)methyl 3,4-epoxycyclohexanecarboxylate and 5 g of bis[(3,4-epoxycyclohexyl)methyl] adipate as a crosslinking agent, 0.5 g of (4-methylphenyl)[4-(2-methylpropyl)phenyl]iodoniumhexafluorophosphate as a photoinitiator, and 54.5 g of methyl ethyl ketone were mixed, thereby preparing a hard coating layer forming composition.

<Manufacture of Glass Substrate Laminate>

Example 1

An reactor in which a nitrogen stream flowed was filled with 252.8 g of DMPA, and 21.7 g (0.06 mol) of 2,2'-bis(trifluoromethyl)-4,4'-diaminodiphenylether (6FODA) was dissolved in a state in which the temperature of the reactor was maintained at 25° C. 30 g (0.06 mol) of 9,9-bis(3,4-dicarboxyphenyl)fluorene dianhydride (BPAF) was added thereto at a temperature of 50° C., and stirring was performed for 24 hours while dissolving. Thereafter, a dimethylol propionic acid (DMPA) solvent was added so that the solid content was 15 wt %, based on the total weight of the composition, thereby preparing a polyimide film forming composition.

After the said polyimide-based resin composition was applied on a support, a heat treatment was performed at 80° C. for 30 minutes and at 300° C. for 30 minutes under a nitrogen atmosphere, and cooling to room temperature was performed. Thereafter, a film formed on the support was separated from the support to obtain a polyimide film having a thickness of 20 µm.

The thus-produced polyimide film was used as the shatter-proof layer, and the hard coating layer forming composition prepared in Preparation Example 1 was applied on the shatter-proof layer using a #10 Mayer bar, and then was dried at 60° C. for 3 minutes. Thereafter, UV rays were irradiated at 1 J/cm² using a high pressure metal lamp, and curing was performed at 150° C. for 10 minutes, thereby forming a hard coating layer having a thickness of 10 µm. An optically transparent adhesive layer (OCA film, TAEK-WANG M-Tech CO., LTD.) was attached to the opposite surface to the surface of the shatter-proof layer on which the hard coating layer was formed with a strength of 2 kgf/cm, and then the optically transparent adhesive layer and the glass substrate (Corning's alumino-silicate gorilla series glass) having a thickness of 700 µm were laminated with a strength of 2 kgf/cm to manufacture a glass substrate laminate in which the glass substrate, the optically transparent adhesive layer, the shatter-proof layer, and the hard coating layer were laminated in that order. At this time, the optically transparent adhesive layer had a thickness of 5 µm.

Example 2

A glass substrate laminate was manufactured in the same manner as in Example 1, except that the thickness of the optically transparent adhesive layer was 10 µm.

Example 3

A glass substrate laminate was manufactured in the same manner as in Example 1, except that the thickness of the optically transparent adhesive layer was 15 µm.

Comparative Example 1

A glass substrate laminate was manufactured in the same manner as in Example 1, except that 3,3,4,4-biphenyltetracarboxylic dianhydride (BPDA) was used instead of BPAF.

Comparative Example 2

A glass substrate laminate was manufactured in the same manner as in Example 1, except that cyclobutane tetracarboxylic dianhydride was used instead of BPAF, and the composition of the shatter-proof layer was changed as shown in Table 1.

Comparative Example 3

A glass substrate laminate was manufactured in the same manner as in Example 1, except that a cyclic olefin polymer (COP) film (ZEON) was used instead of a polyimide film as the shatter-proof layer.

Comparative Example 4

A glass substrate laminate was manufactured in the same manner as in Example 1, except that the thickness of the optically transparent adhesive layer was 2 µm.

Comparative Example 5

A glass substrate laminate was manufactured in the same manner as in Example 1, except that the thickness of the hard coating layer was 1 µm.

The physical properties of the glass substrate laminates manufactured in Examples 1 to 3 and Comparative Examples 1 to 5 were measured and are shown in the following Table 1.

TABLE 1

| | Composition of shatter-proof layer (eq) | | | | Thickness of shatter-proof layer (µm) | Thickness of hard coating layer (µm) | Thickness of adhesive layer (µm) | Adhesive strength (gf/in) | $|R_{th}|$ | Rainbow phenomenon | Flame retardant grade | Surface hardness | Shattering resistance |
|---|---|---|---|---|---|---|---|---|---|---|---|---|---|
| | 6FA ODA | BP DA | BP AF | CB DA | | | | | | | | | |
| Example 1 | 1 | | 1 | | 20 | 5 | 5 | 310 | 1841 | OK | V-0 | 5H | OK |
| Example 2 | 1 | | 1 | | 20 | 5 | 10 | 340 | 1841 | OK | V-0 | 5H | OK |

TABLE 1-continued

| | Composition of shatter-proof layer (eq) | | | | Thickness of shatter-proof layer (μm) | Thickness of hard coating layer (μm) | Thickness of adhesive layer (μm) | Adhesive strength (gf/in) | $|R_{th}|$ | Rainbow phenomenon | Flame retardant grade | Surface hardness | Shattering resistance |
|---|---|---|---|---|---|---|---|---|---|---|---|---|---|
| | 6FA ODA | BP DA | BP AF | CB DA | | | | | | | | | |
| Example 3 | 1 | | 1 | | 20 | 5 | 15 | 400 | 18 41 | OK | V-0 | 5H | OK |
| Comparative Example 1 | 1 | 1 | | | 20 | 5 | 5 | 53 | 28 27 | NG | V-0 | 3H | OK |
| Comparative Example 2 | 1 | | | 1 | 20 | 5 | 5 | 293 | 22 38 | NG | V-0 | 3H | NG |
| Comparative Example 3 | Cyclic olefin polymer (COP) | | | | 20 | 5 | 5 | 280 | 10 | OK | V-3 | 3H | OK |
| Comparative Example 4 | 1 | | 1 | | 20 | 1 | 2 | 270 | 18 41 | OK | V-0 | 6B | OK |
| Comparative Example 5 | 1 | | 1 | | 20 | 1 | 5 | 285 | 20 11 | OK | V-0 | 3H | NG |

Referring to Table 1, the glass substrate laminates of Examples 1 to 3 included the hard coating layer and the optically transparent adhesive layer having a thickness of 5 to 20 μm and a shatter-proof layer having a thickness of 20 to 50 μm, had the absolute value of the retardation in the thickness direction ($R_{th}$) of 2000 nm or less, and had a force required to pull the protective film of the optically transparent adhesive layer, the shatter-proof layer, and the hard coating layer, which was attached to the glass substrate, under the conditions of a peeling speed of 300 mm/min and a peeling angle of 180° to completely separate the protective film, of 300 gf/in or more. Accordingly, it was confirmed that the glass substrate laminates of Examples 1 to 3 had excellent photoisotropy, had no rainbow phenomenon to be observed so that visibility was very good, and had a flame retardant grade of V-0 as evaluated in accordance with the UL-94 VB flame retardant specification so that flammability resistance was very good.

In addition, it was confirmed that the glass substrate laminates of Examples 1 to 3 had no breakage even when a steel ball (weight: 500 g) was dropped from a height of 3 m, so that they had very good shattering resistance, and had a very good surface hardness of 5H or more.

However, it was confirmed that the glass substrate laminates of Comparative Examples 1, 2, and 4 had an adhesive strength between the glass substrate and the protective film of 300 gf/in or less, and thus, had deteriorated surface hardness and/or were broken when a steel ball (weight: 500 g) was dropped from a height of 3 m.

In addition, it was confirmed that the glass substrate laminates of Comparative Example 1 had the absolute value of the retardation in the thickness direction ($R_{th}$) of more than 2000 nm, and thus, caused a rainbow mura phenomenon and had reduced visibility.

In addition, it was confirmed that the glass substrate laminate of Comparative Example 3 to which a COP film was applied as a shatter-proof layer had a flame retardant grade of V-3 as evaluated in accordance with the UL-94 VB flame retardant specification, so that flammability resistance was significantly lowered, and its surface hardness was deteriorated.

In addition, it was confirmed that the glass substrate laminates of Comparative Example 4 having the thickness of the optically transparent adhesive layer of less than 5 μm, Comparative Example 5 having the thickness of the hard coating layer of less than 5 μm, had significantly reduced surface hardness as compared with the glass substrate laminates of Examples 1 to 3, and/or were broken when a steel ball (weight: 500 g) was dropped from a height of 3 m, and thus, had surface properties vulnerable to external impact.

Therefore, the glass substrate laminate according to an implementation may improve a shattering phenomenon when the glass substrate is broken, may not be easily burned by fire and the like to secure user's safety, may have excellent photoisotropy to significantly improve visibility, may have excellent adhesive strength between the glass substrate and the protective film so that durability is not deteriorated even during a long-term use, and may prevent defects due to peeling when the protective film is removed or after reliability evaluation.

A glass substrate laminate, which may secure excellent surface hardness, shattering resistance to external impact, and flammability resistance, has no rainbow phenomenon, and has improved visibility, may be provided.

Hereinabove, although the present invention has been described by specified matters and specific exemplary embodiments, they have been provided only for assisting in the entire understanding of the present invention. Therefore, the present invention is not by the specific matters limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

What is claimed is:

1. A protective film for glass substrate protective film comprising:
    an optically transparent adhesive layer;
    a polyimide-based shatter-proof layer formed on the optically transparent adhesive layer; and a hard coating layer formed on the polyimide-based shatter-proof layer, wherein the hard coating layer and the optically transparent adhesive layer have a thickness of 5 to 20 µm, respectively, the polyimide-based shatter-proof layer has a thickness of 20 to 50 µm, wherein the polyimide-based shatter-proof layer includes a polyimide polymer including a unit derived from an aromatic diamine containing fluorine atom, and an aromatic dianhydride, wherein the aromatic dianhydride comprises BPAF (9,9-bis(3,4-dicarboxyphenyl) fluorene dianhydride), and wherein the hard coating layer includes a unit derived from a condensate of alkoxysilane having an epoxy group.

2. The protective film for glass substrate of claim 1, wherein the condensate of alkoxysilane having an epoxy group is a silsesquioxane resin having an epoxy group.

3. The protective film for glass substrate protective-film of claim 1, wherein the hard coating layer further includes a unit derived from a crosslinking agent having a polyfunctional epoxy group.

4. A glass substrate laminate comprising:
a glass substrate; and
the protective film for glass substrate of claim 1 on one surface of the glass substrate
wherein the glass substrate laminate has an absolute value of a retardation in a thickness direction (Rth) of 2000 nm or less, and an adhesive strength between the glass substrate and the optically transparent adhesive layer is 200 gf/in or more.

5. The glass substrate laminate of claim 4, wherein the glass substrate has a thickness of 100 to 1000 µm.

6. The glass substrate laminate of claim 4, wherein the glass substrate laminate has a flame retardant grade of V-0 as evaluated in accordance with a UL-94 VB flame retardant specification.

7. The glass substrate laminate of claim 4, wherein the glass substrate laminate has a pencil hardness in accordance with ASTM D3363 of 4H or more.

8. A method for manufacturing a glass substrate laminate, the method comprising:
applying a hard coating layer forming composition on one surface of a polyimide-based shatter-proof layer and curing the composition to form a hard coating layer;
attaching an optically transparent adhesive layer to the other surface of the polyimide-based shatter-proof layer; and
laminating a glass substrate on the optically transparent adhesive layer, wherein the hard coating layer and the optically transparent adhesive layer have a thickness of 5 to 20 µm, respectively, the polyimide-based shatter-proof layer has a thickness of 20 to 50 µm, the glass substrate laminate has an absolute value of a retardation in a thickness direction ($R_{th}$) of 2000 nm or less, and an adhesive strength between the glass substrate and the optically transparent adhesive layer is 200 gf/in or more, wherein the polyimide-based shatter-proof layer includes a polyimide polymer including a unit derived from an aromatic diamine containing fluorine atom, and an aromatic dianhydride, wherein the aromatic dianhydride comprises BPAF (9,9-bis(3,4-dicarboxyphenyl) fluorene dianhydride), and wherein the hard coating layer includes a unit derived from a condensate of alkoxysilane having an epoxy group.

9. The method for manufacturing a glass substrate laminate of claim 8, wherein the condensate of alkoxysilane having an epoxy group is a silsesquioxane resin having an epoxy group.

10. The method for manufacturing a glass substrate laminate of claim 8, wherein the hard coating layer forming composition further includes a crosslinking agent having a polyfunctional epoxy group.

11. The method for manufacturing a glass substrate laminate of claim 8, wherein the glass substrate laminate has a flame retardant grade of V-0 as evaluated in accordance with a UL-94 VB flame retardant specification.

12. The method for manufacturing a glass substrate laminate of claim 8, wherein the glass substrate laminate has a pencil hardness in accordance with ASTM D3363 of 4H or more.

13. A display panel comprising the glass substrate protective film of claim 1.

* * * * *

UNITED STATES PATENT AND TRADEMARK OFFICE
CERTIFICATE OF CORRECTION

PATENT NO. : 12,233,637 B2
APPLICATION NO. : 17/849826
DATED : February 25, 2025
INVENTOR(S) : Hyun Joo Song et al.

Page 1 of 1

It is certified that error appears in the above-identified patent and that said Letters Patent is hereby corrected as shown below:

In the Claims

Column 20, Line 63, Claim 1, after "substrate" delete "protective film"

Column 21, Line 12, Claim 1, delete "dicarboxyphenyl) fluorene" and insert -- dicarboxyphenyl)fluorene --

Column 21, Line 19, Claim 3, after "substrate" delete "protective-film"

Column 22, Line 21, Claim 8, delete "dicarboxyphenyl) fluorene" and insert -- dicarboxyphenyl)fluorene --

Signed and Sealed this
Third Day of June, 2025

Coke Morgan Stewart
*Acting Director of the United States Patent and Trademark Office*